United States Patent [19]

Ayers et al.

[11] 4,205,456
[45] Jun. 3, 1980

[54] HEAT PUMP ARRANGEMENT AND METHOD FOR MATERIAL DRYING SYSTEM

[75] Inventors: David L. Ayers, West Lafayette; Mark R. Hogan, Lafayette, both of Ind.

[73] Assignee: Westinghouse Electric Corp., Pittsburgh, Pa.

[21] Appl. No.: 681,888

[22] Filed: Apr. 30, 1976

[51] Int. Cl.² .............................................. F26B 3/06
[52] U.S. Cl. .......................................... 34/35; 34/77; 34/86; 62/79
[58] Field of Search .................... 34/76, 77, 26, 32, 27, 34/35, 86; 62/93, 238, 278, 79

[56] References Cited

U.S. PATENT DOCUMENTS

| 1,119,011 | 12/1914 | Grosvenor | 62/238 |
| 2,418,239 | 4/1947 | Smith | 34/77 |
| 2,627,669 | 2/1953 | Candor | 34/76 |
| 2,676,418 | 4/1954 | Shewmon | 62/238 |
| 3,036,383 | 5/1962 | Edwards | 34/76 |
| 3,732,703 | 5/1973 | Nordstrom | 62/278 |
| 4,071,080 | 1/1978 | Bridgers | 62/79 |

*Primary Examiner*—Larry I. Schwartz
*Attorney, Agent, or Firm*—E. C. Arenz

[57] ABSTRACT

A mechanical refrigeration system is arranged to function as a heat pump for the purpose of drying material, such as shelled corn for example, with ambient air being first passed through the refrigerant condenser to be heated, then passed through the material to be dried, and then passed through the refrigerant evaporator and discharged back to atmosphere.

5 Claims, 4 Drawing Figures

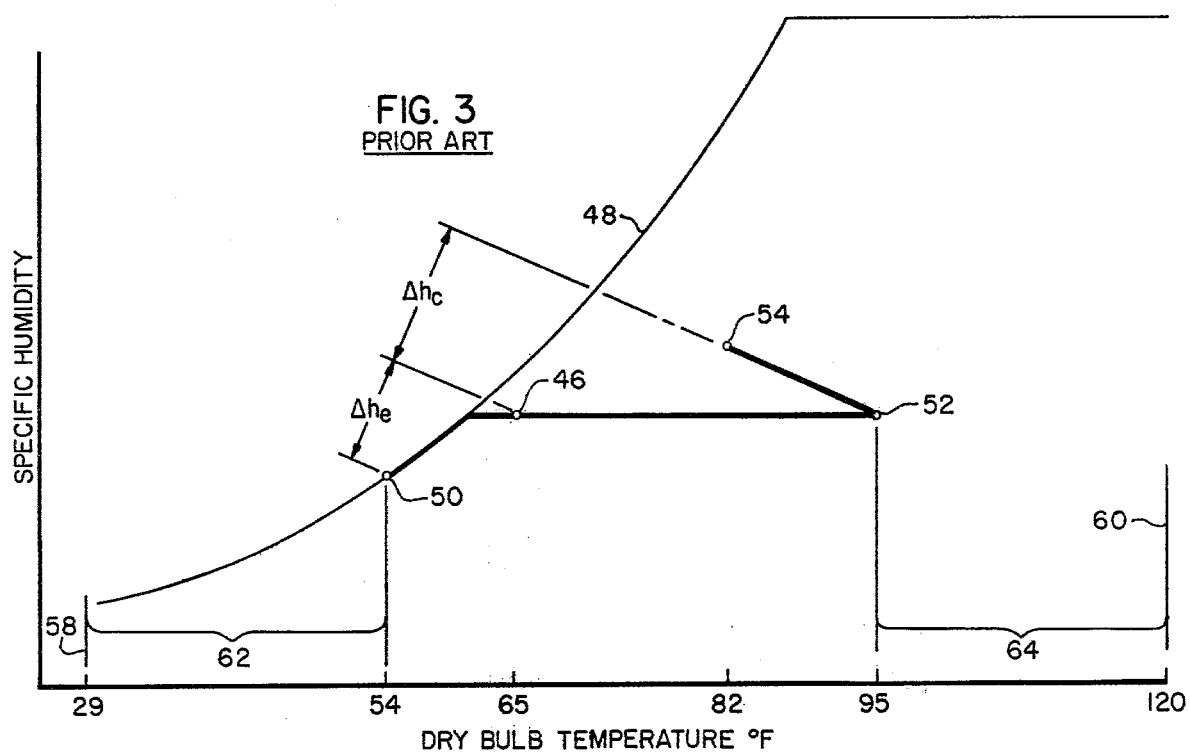
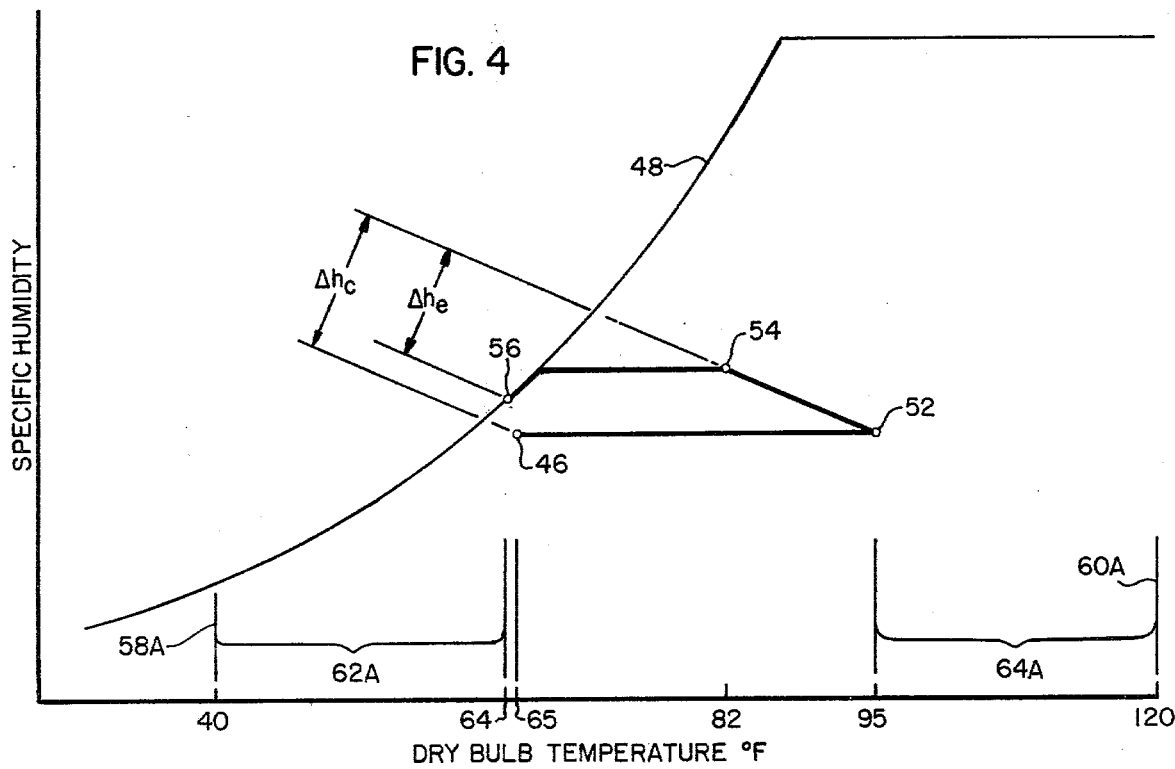

ial drying, particular to the art of using a heat pump to temper the air being used for drying purposes.

HEAT PUMP ARRANGEMENT AND METHOD FOR MATERIAL DRYING SYSTEM

BACKGROUND OF THE INVENTION

The invention pertains to the art of material drying, and in particular to the art of using a heat pump to temper the air being used for drying purposes.

DESCRIPTION OF THE PRIOR ART

In recent years, grain drying has become a major agriculture consumer of fossil fuel energy such as liquefied petroleum gas and natural gas. In the corn belt the demand for the fuel occurs generally during the period of less than three months after early October, with the particular timing and the quantity of fuel required varying considerably in accordance with the weather and the size of the crop. While the problem of obtaining sufficient liquefied petroleum gas for grain drying has been minimal in the past, it is believed likely that there will be short term and probably long term shortages of liquefied petroleum gas and other convenience fossil fuels. Accordingly, some thought has been given to using alternative energy sources, such as electricity, for grain drying needs.

One alternative way to use electricity is with electric resistance heating but its superficial desirability may be negated in view of possible future electricity shortages, as well as the electrical equipment capacity requirements for resistance heating. Accordingly, another alternative way to use electricity which has been considered and has been used to a limited degree is the heat pump which, by its nature, provides a coefficient of performance which is in excess of that obtained with electric resistance heating. The heat pump is also advantageous as compared to liquefied petroleum gas in its energy cost to produce a given quantity of heat under typical drying conditions. The disadvantage of the heat pump relative to the drying systems using liquefied petroleum gas is that there is an initial high first cost for the heat pump equipment.

It is our view that the heat pump is a desirable alternative to consider for the purposes of grain and other drying, but that it should be configured in a manner that best utilizes the energy available in the operation of a heat pump. Of the prior art of which we are aware, both open-air-loop and closed-air-loop drying systems using heat pumps have been suggested. One prior art arrangement believed to be in actual use has a heat pump arranged so that ambient air is taken from the atmosphere and is directed through a refrigeration condenser to heat the air and this air is then passed through the material to be dried and discharged to the atmosphere. Ambient air is also taken from the atmosphere and is directed through the refrigerant evaporator and is discharged back to atmosphere. That arrangement is considered a basic open-air-loop system.

A closed-air-loop system is disclosed in U.S. Pat. No. 3,931,683 in which the refrigerant condenser is immersed in the material to be dired, and a closed-air loop is provided which flows air in a circuit including the condenser and the material to be dried in series with the refrigerant evaporator which is characterized in the patent as a "condenser", ostensibly because moisture will be condensed from the air stream upon the evaporator.

U.S. Pat. No. 3,762,065 discloses an arrangement which would probably be best characterized as a closed-loop arrangement since the material to be dried is enclosed within a sealable container along with the condenser and the evaporator, the condenser coils being immersed in the material to be dried, and the moist air driven from the material passing out for flow through the evaporator where the moisture is condensed therefrom.

Closed air systems in which refrigeration equipment is used in connection with clothes dryers are also shown in U.S. Pat. Nos. 2,521,081 and 2,418,239.

The basic aim of our invention is to provide a heat pump system in which the components thereof are so located, relative to the process being carried out, that advantage is taken of the conditions to obtain the best coefficient of performance available.

SUMMARY OF THE INVENTION

In accordance with the invention, the heat pump is arranged with the condenser receiving and heating ambient air taken from the atmosphere, which air is then passed through the material to be dried, and is then passed through the heat pump evaporator, from which the air is discharged back to atmosphere. This arrangement and method makes use of the elevated energy level in the air exhausted from the material being dried and avoids the requirement of significant duct work to direct the air leaving the evaporator back for passage through the condenser, as occurs in a closed-loop system.

DRAWING DESCRIPTION

FIG. 3 is a psychrometric chart illustrating the changes in the condition of the air used in a FIG. 2 arrangement; and FIG. 4 is a psychrometric chart for the conditioning of the air occurring when the arrangement according to the invention is used.

DESCRIPTION OF THE PREFERRED EMBODIMENT

Figure 1:
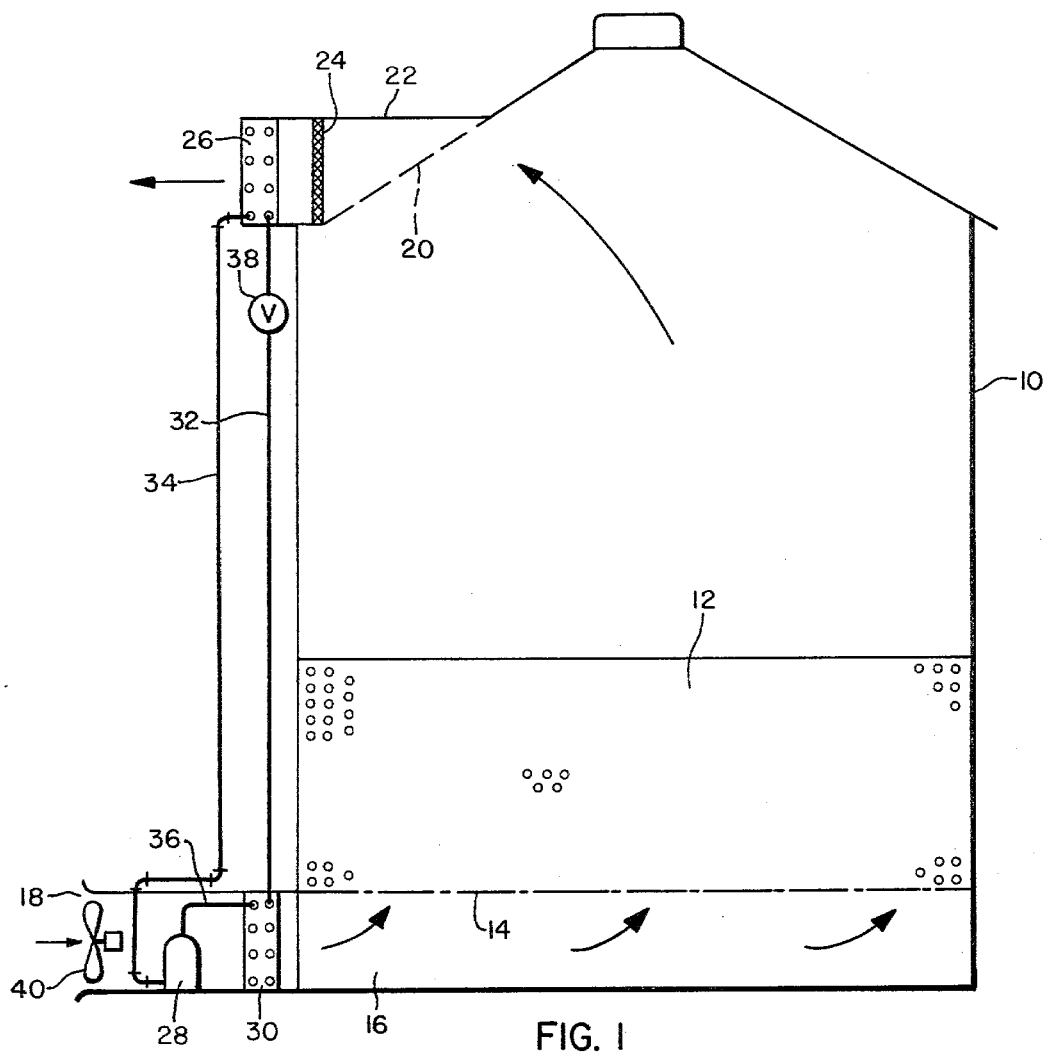
FIG. 1 is a schematic view in the nature of a vertical section showing a heat pump system according to the invention in relation to the containment means within which the material to be dried is located.

FIG. 1 illustrates the basic relationship of the heat pump system and the containment means for the material to be dried. In FIG. 1, the containment means comprises a bin 10 in which a batch of the material 12, which may be shelled corn for example, is placed to undergo the drying operation. The air inlet means to the bin 10 may comprise a perforated floor 14 which admits air flowing in a first air flow path 16 which in turn has its inlet 18 open to the atmosphere. The bin 10 also has an air outlet 20 communicating with a second air flow path 22 containing an air filter 24 which extends thereacross, and which prevents most of the airborne contaminants from reaching the refrigerant evaporator 26. The air passing through the evaporator is discharged back to atmosphere.

The heat pump basically includes a refrigerant compressor 28, a refrigerant condenser 30, the evaporator 26, and the connecting refrigerant lines 32, 34 and 36. The usual refrigerant expansion means such as an expansion valve 38 is also provided.

The flow of air is as indicated by the arrows, and is created by blower means 40, which may be located at the inlet to the first air flow path. Ambient air is drawn in by the blower and is heated by condenser 30 before flowing into the air distributing inlet means 14 of the bin 10 and through the material 12. The heated air will typically be cooled and pick up moisture as it passes through the material 12 to be dried. The cooled, moist air then passes into the second air flow path 22 and through the evaporator 26 and back to atmosphere. The advantage of locating the evaporator in the exhaust air stream from the containment means, and discharging the air back to atmosphere, will be considered in some detail after the prior art arrangement of FIG. 2 is first described.

Figure 2:
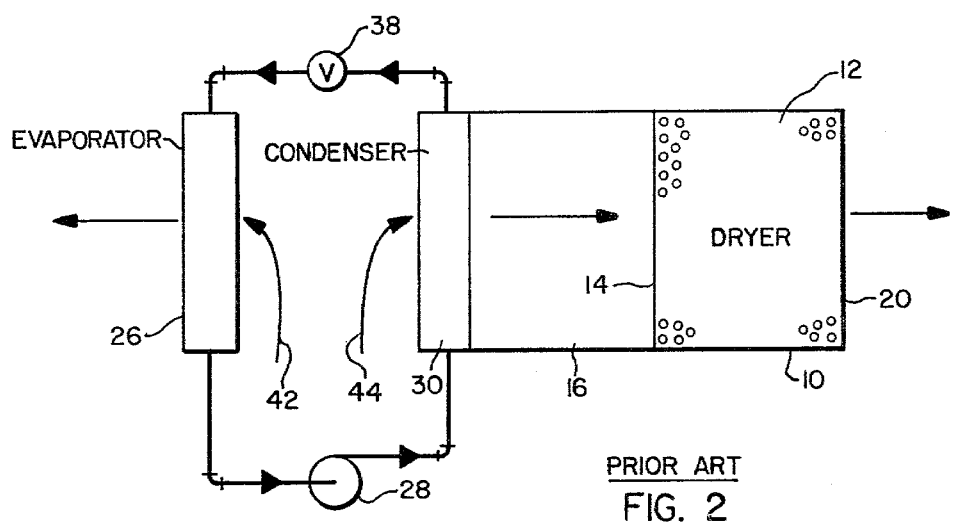
FIG. 2 is a schematic view of a known prior art heat pump system used for drying.

In the prior art FIG. 2 arrangement, the elements which correspond to the elements of FIG. 1 are given identical numerals. The heat pump is arranged with separate streams of ambient air being directed through the evaporator and through the condenser. The arrow 42 indicates the flow of one volume of ambient air through the evaporator while the arrow 44 indicates the flow of a separate volume of ambient air through the condenser. The air which flows through the evaporator is discharged back to atmosphere while that which flows through the condenser is passed through the material 12 and then discharged back to atmosphere.

An understanding of the advantage of an arrangement according to the invention over that of FIG. 2 is aided by reference to the psychrometric charts of FIGS. 3 and 4 illustrating the psychrometrics of the air passing through the systems.

The values indicated on those charts have been determined mathematically from an assumed typical condition of ambient air being at about 65° F. (18° C.) and 85% relative humidity. The heat input for drying purposes for FIG. 3 is selected as 300,000 BTU/hr ($8.8 \times 10^4$ W), the condenser is sized so that its saturation temperature is 120° F. (49° C.) and the air leaving temperature is 95° F. (35° C.), and the air leaving the material being dried is about 82° F. (28° C.) and has a relative humidity of about 60%.

In FIG. 3 representing the prior art arrangement, point 46 indicates the condition of the ambient air in the atmosphere and which is passed both through the evaporator and the condenser. Under a given assumed condition of operation, the change in condition of the ambient air flowing through the evaporator 26 is indicated by the line which extends horizontally to the left from point 46 over to the diagonal saturation line 48 and then follows along that saturation line to the point indicated as 50 which is 54° F. (12° C.). As is conventional in such a process, heat is transferred from the ambient air to the refrigerant in the evaporator to convert that refrigerant from a liquid-vapor mixture to a vapor. The change that occurs in the air as it passes through the evaporator is the removal of sensible heat as indicated by the horizontal line extending to the saturation line 48, and then further air cooling accompanied by condensation and removal of moisture from the air stream as indicated by the portion of the line following diagonally downward along the saturation line. Since a horizontal line on a psychrometic chart of the type illustrated indicates a constant absolute humidity, the air which exits the evaporator and has a condition as indicated at point 50 has a lower absolute humidity than the ambient air indicated at point 46.

The line which extends horizontally to the right in FIG. 3 from point 46 and terminates at point 52 illustrates the addition of sensible heat to the air stream 44 as it flows through the condenser 30. As is conventional in a refrigeration system, the transfer of sensible heat from the refrigerant in the condenser to the air stream passing through the condenser is accompanied by the condensation of the refrigerant in the condenser from a hot gas to a hot liquid. The air having the temperature and humidity conditions indicated by the point 52, i.e., 95° F. (35° C.) and about 33% relative humidity, is now passed through the material 12 to be dried and during its passage through this material the air changes in condition from that indicated at point 52 to that indicated at point 54 which will be a condition of increased absolute and relative humidity as contrasted to point 52, and with a decreased dry bulb temperature. In other words, the air will have been cooled from the sensible heat standpoint and be moistened. This air in the calculated example has a temperature of about 82° F. (28° C.) and a relative humidity of about 60% and is discharged back to atmosphere in an arrangement as shown in FIG. 2.

The psychrometric chart for the air in a system according to the invention is shown in FIG. 4. The condition of the ambient air is again indicated at point 46 and the condition of the air after it is passed through the condenser 30 is indicated by point 52. The air is then directed through the material to be dried and upon exiting is in the condition represented by the point 54, as in the case of FIG. 3. The values for this part of the basic process in conditioning from point 46 to point 52 and to point 54 in both the prior art arrangement of FIG. 2 and in the arrangement according to the invention are the same in the calculated example. However, since the charts are on the basis of one pound of air rather then the total quantity of air, and the election was made to hold points 46, 52 and 54 fixed for making the comparison, the air flow rate for the system according to the invention is adjusted upwardly for the mathematical example. In FIG. 4, the sensibly cooled, moist air having the condition indicated at point 54 is then directed through the evaporator 26 where, as in the case indicated in FIG. 4, the air is sensibly cooled as indicated by the horizontal line extending over to the saturation line 48 and is then further cooled accompanied by condensation and removal of moisture from the air stream to reach the point 56 indicating the condition of the air when it is discharged to atmosphere. The temperature of the air at point 56 is about 65° F. (18° C.).

It will be noted from a comparison of FIGS. 3 and 4, that for purposes of the comparison the processing of the air occurring between point 46 and point 50 in FIG. 3 is basically the same as that between point 54 and point 56 of FIG. 4. That is, under typical conditions of operation the air passing through the evaporator is sensibly cooled and has moisture removed from it in passing through the evaporator. The distinct advantage arising from the arrangement according to the invention is that the air at point 54 has considerably greater heat content or enthalpy than ambient air. The arrangement of the invention in an open air system makes use of the elevated energy level of this exhaust air from the dryer by placing the evaporator there rather than in the ambient air flow as shown in FIG. 2.

FIGS. 3 and 4 also include some vertical lines which indicate different dry bulb temperatures. In FIG. 3 the vertical line 58 at the left indicates the operating temperature of the evaporator and 60 at the right indicates the operating temperature of the condenser. The horizontal distance between point 50 and line 58 of FIG. 3, indicated by the bracket 62, is the temperature difference between the air leaving the evaporator and the temperature of the evaporator. Similarly, the horizontal distance between point 52 and line 60, indicated by the bracket 64, is the temperature difference between the air leaving the condenser and the condenser temperature. The horizontal distance between line 58 and line 60 is the spread in temperature of the refrigerant between the condenser and evaporator. The same numerals with the postscript A are applied to corresponding lines and brackets of FIG. 4.

When a heat pump is sized for a given drying operation requiring a given inlet temperature 52 under an assumed ambient condition, the condenser size will be dictated by the value of the temperature differences 64 and 64A as indicated on the FIGS. 3 and 4. Accordingly, the value of the condenser temperatures 60 and 60A will be basically fixed and the difference between the condenser temperature and evaporator temperature will serve as a measure of the system coefficient of performance and the compressor pressure ratio as well. As is well-known in the refrigeration art, it is best to keep the temperature difference between the condenser and evaporator as low as possible because this results in an increased coefficient of performance and reduced strain on the compressor.

By comparing FIGS. 3 and 4, it may be seen that with the arrangement according to the invention, the net effect of placing the evaporator in the exhaust from the dryer results in a reduction of the temperature difference between the refrigerant in the condenser and evaporator. That yields an increased coefficient of performance and reduces the compressor pressure ratio.

The specific values provided on the two psychrometric charts of FIGS. 3 and 4 have been determined for a particular example. These values will change in accordance with different weather conditions and of course with the size or capacity of the various components of the heat pump system. Additionally, the moisture conditions and temperature of the material to be dried will have an effect upon the values. Thus, with a condition of the corn being relatively wet, the line in FIG. 4 extending from point 52 to point 54 may extend all the way to the saturation line 48 before it follows downwardly therealong. Then, as the corn tends to dry, the horizontal component of the line between point 54 and point 56 will appear and increase in length as the drying progresses.

While it is not considered necessary to set forth all of the calculations for the examples of FIGS. 3 and 4, the more significant values for the operation of the two systems are believed useful. As noted before, for FIG. 3 the heat input to the system from the condenser is 300,000 BTU/hr ($8.8 \times 10^4$ W). The air flow rate is 41,667 lbs/hr ($1.89 \times 10^4$ Kgs), the heat absorbed by the evaporator is 233,000 BTU/hr ($6.82 \times 10^4$ W), and the compressor work is 67,000 BTU/hr ($1.97 \times 10^4$ W). Thus the coefficient of performance of the FIG. 3 prior art from the thermal standpoint calculates to about 4.45.

Regarding the FIG. 4 system value, as noted before to maintain certain temperatures fixed for calculation purposes, the air flow rate is adjusted upwardly and the heat input to the system from the condenser is also increased. These calculated values are 47,900 lbs/hr ($2.17 \times 10^4$ Kgs) and 345,000 BTU/hr ($1.0 \times 10^5$ W), respectively. The heat absorbed by the evaporator is 286,000 BTU/hr ($8.38 \times 10^4$ W) and the compressor work is 59,000 BTU/hr ($1.73 \times 10^4$ W). Thus the coefficient of performance of the system according to the invention from the thermal standpoint is 5.86, which is significantly higher than that of the prior art arrangement.

The calculations for the foregoing results required the use of an iterative process and thus are slightly inexact for that reason. Also, the compressor process is assumed to be isentropic and the throttling process isoenthalpic. The coefficients of performance do not include the fan work, but it is noted that the heat generated thereby is used in the drying anyway.

The applicability of the invention is currently believed to preferably be for what is called low speed drying in which the temperature of the air directed to the material is relatively low and with a relatively large volume of air, such as at least 2 cubic feet per minute per bushel ($9.4 \times 10^{-4}$ m$^3$/s/$3.5 \times 10^{-2}$ m$^3$). A relatively larger evaporator than would normally be used in a residential type heat pump is employed because of the relatively low ambient temperature in which the system is to be used and the possibility of the temperature at point 56 being relatively close to the evaporator temperature when ambient temperature is relatively low.

It is also noted that comparisons of the coefficient of performance of the prior art arrangement of FIG. 3 and that of the invention of FIG. 4 may be visualized from the diagonal enthalpy lines on the psychrometric chart and the change in enthalpy of a pound of air passing through the condenser and evaporator as indicated. The difference between these values is a measure of the compressor work and may be used in the classical formula for calculating coefficient of performance in which the coefficient of performance for the total system is equal to the change in enthalpy of the air passing through the condenser divided by the compressor work and the fan work.

While the description has proceeded with the invention being applied, for example, to a drying system for shelled corn, the invention is not limited in its applicability only to dry shelled corn or other grains. It may also be applied in tobacco drying, for example, as well as other materials having drying requirements compatible with the character of drying attainable with the heat pump system.

We claim:

1. A heat pump system for drying material in a containment means having air inlet means for the admission of air to effect the drying, and having air outlet means for the discharge of air having passed through the containment means, comprising:

a mechanical refrigeration system including a refrigerant condenser in the path of air flow to said air inlet, a refrigerant evaporator in the path of air flow leaving said air outlet, and a refrigerant compressor connected by means to said condenser and evaporator for operating said refrigeration system in a heat pump mode, and means for passing ambient air through said condenser, said containment means and then through said evaporator and discharging substantially all of said air back to atmosphere.

2. For drying apparatus having containment means for material to be dried and an air flow system for passing air through said containment means, a heat pump system for tempering the air passed through said containment means, comprising:

a refrigerant condenser located in said air flow system to heat ambient air before the air passes into the containment means, a refrigerant evaporator located in said air flow system to receive heat from the air leaving said containment means before the air is rejected to atmosphere, and a refrigerant compressor and means connecting said compressor to said condenser and evaporator for operation in a heating mode.

3. Material dryer apparatus including:

containment means for said material;

means defining a first air flow path connected to an air inlet opening to said containment means;

means defining a second air flow path connected to an air outlet opening from said containment means;

a mechanical refrigeration system including a refrigerant compressor, a refrigerant condenser in said first air flow path, and a refrigerant evaporator in said second air flow path, said compressor, condenser and evaporator being connected to operate in a heating mode; and means for flowing ambient air into said first air flow path, through said containment means and through said second air flow path back to atmosphere.

4. The method of drying a material in a containment means with air tempered by a mechanical refrigeration system connected to function as a heat pump, comprising:

passing ambient air through a condenser of the refrigeration system to heat the ambient air;

passing said heated ambient air through said containment means to dry said material, while imparting moisture to, and reducing the sensible heat content of, said air;

passing the air leaving said containment means through an evaporator of the refrigeration system to transfer a part of the heat content of the air leaving said containment means to the refrigerant in the evaporator; and discharging back to ambient substantially all of the air leaving said evaporator.

5. The method of drying material in a containment means by operating a mechanical refrigeration system as a heat pump and flowing air in heat transfer relation therewith, comprising:

adding sensible heat to ambient air with a refrigeration condenser;

passing said heated air through said material to remove moisture from said material;

transferring part of the heat content of the air having passed through the material to a refrigerant evaporator of the system; and discharging all of the air leaving said evaporator back to the atmosphere.

* * * * *